US006725257B1

(12) United States Patent
Cansler et al.

(10) Patent No.: US 6,725,257 B1
(45) Date of Patent: Apr. 20, 2004

(54) COMPUTATIONALLY EFFICIENT PROCESS AND APPARATUS FOR CONFIGURING A PRODUCT OVER A COMPUTER NETWORK

(75) Inventors: Leslie Dean Cansler, Oregon City, OR (US); Stephen A. Feiner, Portland, OR (US)

(73) Assignee: Chrome Data Corporation, Portland, OR (US)

( * ) Notice: Subject to any disclaimer, the term of this patent is extended or adjusted under 35 U.S.C. 154(b) by 0 days.

(21) Appl. No.: 09/452,726

(22) Filed: Nov. 30, 1999

(51) Int. Cl.[7] .......................... G06F 15/16; G06F 17/60
(52) U.S. Cl. .................. 709/219; 709/203; 705/26; 705/27
(58) Field of Search .................. 705/26, 27; 709/217, 709/219, 203, 329

(56) References Cited

U.S. PATENT DOCUMENTS

| | | | |
|---|---|---|---|
| 5,708,798 A | | 1/1998 | Lynch et al. |
| 5,794,207 A | | 8/1998 | Walker et al. |
| 5,825,651 A | * | 10/1998 | Gupta et al. ............ 364/468.09 |
| 6,064,982 A | * | 5/2000 | Puri ............................. 705/27 |
| 6,083,267 A | * | 7/2000 | Motomiya et al. .............. 703/6 |
| 6,167,383 A | * | 12/2000 | Henson ........................ 705/26 |
| 6,230,199 B1 | * | 5/2001 | Revashetti et al. .......... 709/224 |
| 6,233,609 B1 | * | 5/2001 | Mittal .......................... 709/219 |
| 6,236,979 B1 | * | 5/2001 | Kawabata ..................... 705/27 |
| 6,324,578 B1 | * | 11/2001 | Cox et al. ................... 709/223 |
| 6,535,913 B2 | * | 3/2003 | Mittal et al. ................. 709/219 |

FOREIGN PATENT DOCUMENTS

WO    WO98/21679    5/1998

OTHER PUBLICATIONS

Dell Computer Online shopping/E–Commerce Site With New Features, Round Rock, May 21, 1998.*

Draft Proposal: An Industry Standard Data Format for the Export and Import of Automotive Customer Leads from www.carpoint.msn.com, 21 pages.

* cited by examiner

Primary Examiner—Ario Etienne
Assistant Examiner—Abdullahi E. Salad
(74) Attorney, Agent, or Firm—Blakely Sokoloff Taylor & Zafman LLP

(57) ABSTRACT

The present invention provides a process for configuring a product using a server and a client connected by a computer network, wherein the product has multiple possible configurations, and wherein each configuration is defined by a set of standard attributes and a set of optional attributes. The process comprises receiving from the client a request for a base configuration comprising the set of standard attributes, transmitting to the client the standard attribute set for the base configuration, and transmitting to the client a plurality of Web pages containing an option data set including all possible optional attributes and a set of commands, the set of commands being executed on the client and allowing a user to select the set of optional attributes using the client. The present invention also provides an apparatus for configuring a product using a computer network, wherein the product has multiple possible configurations, and wherein each configuration defined by a set of standard attributes and a set of optional attributes. The apparatus comprises a server connected to the network, wherein the server comprises a processor, a memory, and a storage device, and wherein the processor and memory are operative with a program stored on the storage device to receive from a client a request for a base configuration comprising the standard set of attributes, transmit to the client the standard attribute set for the base configuration, and transmit to the client computer a plurality of Web pages containing an option data set including all possible optional attributes and a set of commands, wherein the set of commands is executed on the client and allows a user to select the set of optional attributes.

22 Claims, 8 Drawing Sheets

COMPUTATIONALLY EFFICIENT PROCESS AND APPARATUS FOR CONFIGURING A PRODUCT OVER A COMPUTER NETWORK

FIELD OF THE INVENTION

This invention relates to an apparatus and process for configuring a product over a computer network, and more particularly to an apparatus and process for efficiently configuring a product having multiple possible configurations over a computer network.

BACKGROUND

Although at first a mere curiosity used by scientific researchers, the Internet has come to be a significant factor in everyday life. Along with the increasingly common use of the Internet for entertainment and communication has come a sizeable increase in the use of the Internet in electronic commerce. At first, e-commerce consisted mainly of merchants selling standardized products such as videos, CD's and books. But more recently, merchants have started using the Internet to sell goods that are highly customized, such as automobiles, computers and electronics. For any one of such goods there are many options from which an Internet user can choose to configure their own customized product. Although great for the user, this customization process poses problems for the merchant because it requires a fair amount of computational power for each transaction. As more people seek to buy these customized products over the Internet, the demand results in increased load on the merchant's server. The increased load on the server in turn degrades the user's response time and may eventually overwhelm the server and lead to system failures. Thus, there is a premium on finding efficient ways to process user requests and configuration of the user's customized product.

Existing approaches to selling user-configurable products over a network are generally very inefficient at handling the configuring process. A first approach is to handle all the configuration-related computation on the merchant's server; this is known as "server-side processing." With server-side processing, every time a user picks a product option or otherwise interacts with the configuration process, he or she interacts with the server, which receives the user's input, processes the option selection, and sends an update of the currently existing configuration to the user. This approach works well if a small number of users are using the merchant's server. If there are many users using the server—which is, of course, what every merchant wants—the frequent request from many users demanding computational resources from the server can cause the server to run extremely slowly and, in extreme cases, to stop functioning altogether. From the user's point of view, this option is slow because of the repeated communications needed with the server to upload input and download results via the network, and the computation time required on the server for each operation.

A second approach for configuring customized products over a computer network is to have the merchant's server do some of the processing and have the user's computer, referred to as a client, do some of the processing. Such an approach relieves the server of some of its computational load, but the remaining load may still be too high for the server if the number of clients accessing the system is high. For the user, this approach may still be too slow because of the remaining server load, and because of the multiple communications over the network that must take place between the code processing information on the client and the code processing information on the server.

A third approach that has been tried for configuring customized products is to transfer essentially all of the computation involved to the client machine instead of the server. This "client-side processing" approach increases server efficiency, because the server does very little computation and can thus handle a very large number of client requests without becoming overwhelmed. The computational load is instead shifted to a widely distributed network of clients that are accessing the server, each of which is probably lightly loaded. Although it increases efficiency, however, client-side processing has so far been applied inefficiently. Currently, when the user uses the client machine to access the server, the server downloads an independently executable module (for example, a Java applet, a browser plug-in or an Active X component) onto the client, so that the user can then use the executable module running on the client to configure the product. The executable modules, however, are usually large and take a long time for a user to download onto the client, especially if the client has a slow connection to the Internet. Even users with high-speed Internet access may have problems with the executable modules, because many network firewalls are designed to keep these modules from being downloaded onto the client system. In addition, the downloaded executables pose substantial browser compatibility problems. Active X modules, for example, cannot be run on Apple MacIntosh computers. Finally, if the merchant makes any changes to their configuration process, a new module must be downloaded every time the process changes.

Because of the disadvantages of present implementations of client-side processing, there is thus a need in the art for an apparatus and process that allows a user to configure a customized product over a computer network. The apparatus and process preferably exploit the benefits of client-side processing while avoiding the downfalls of present approaches.

SUMMARY OF THE INVENTION

The present invention provides a process for configuring a product using a server and a client connected by a computer network, wherein the product has multiple possible configurations, and wherein each configuration is defined by a set of standard attributes and a set of optional attributes. The process comprises receiving from the client a request for a base configuration comprising the set of standard attributes, transmitting to the client the standard attribute set for the base configuration, and transmitting to the client a plurality of Web pages containing an option data set including all possible optional attributes and a set of commands, the set of commands being executed on the client and allowing a user to select the set of optional attributes using the client. The present invention also provides an apparatus for configuring a product using a computer network, wherein the product has multiple possible configurations, and wherein each configuration defined by a set of standard attributes and a set of optional attributes. The apparatus comprises a server connected to the network, wherein the server comprises a processor, a memory, and a storage device, and wherein the processor and memory are operative with a program stored on the storage device to receive from a client a request for a base configuration comprising the standard set of attributes, transmit to the client the standard attribute set for the base configuration, and transmit to the client computer a plurality of Web pages containing an option data set including all possible optional attributes and a set of commands, wherein the set of commands is executed on the client and allows a user to select the set of optional attributes.

DETAILED DESCRIPTION OF THE INVENTION

Figure 1:
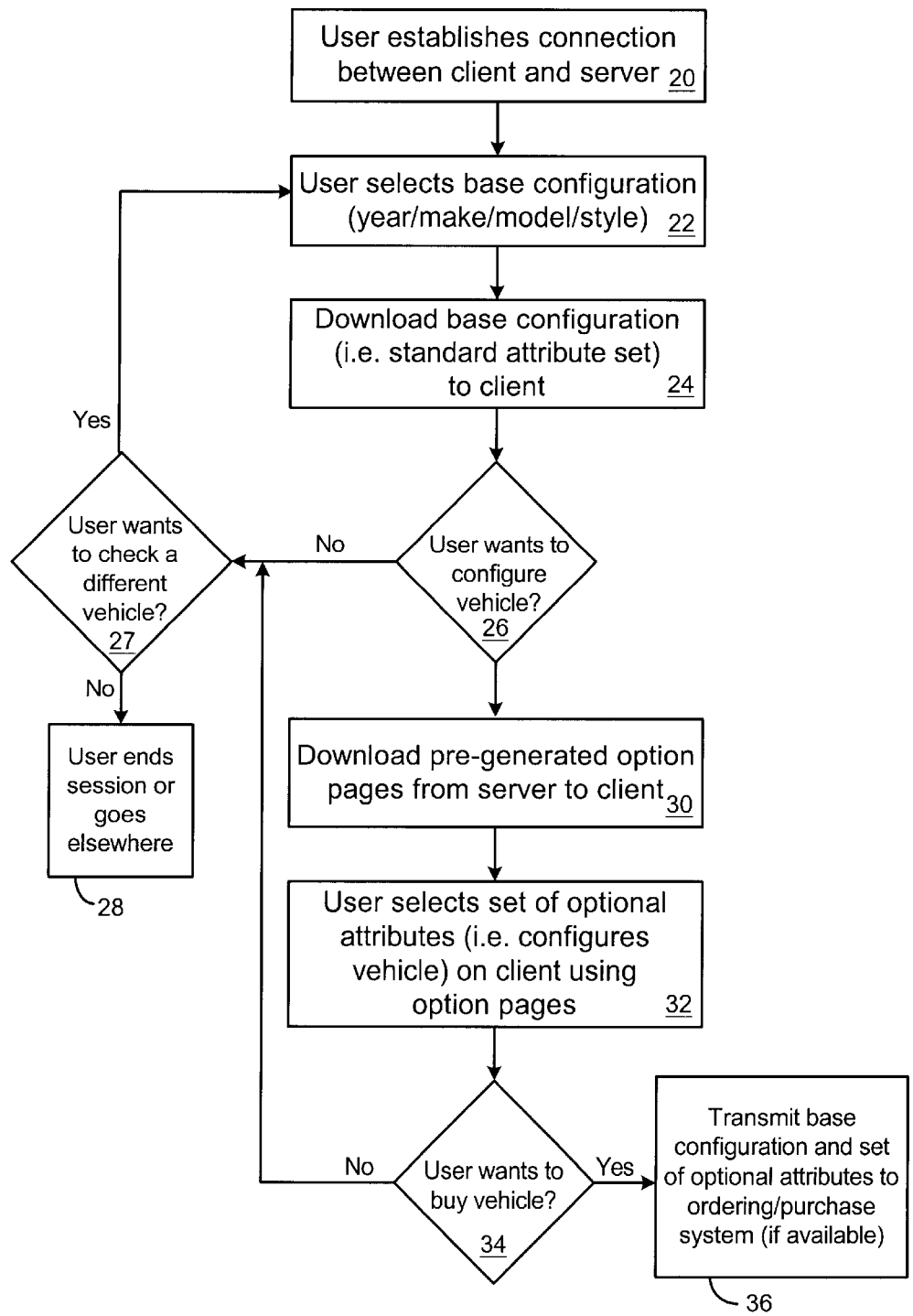
FIG. 1 is a flowchart showing an embodiment of the inventive configuration process.

Described below is an embodiment of the present invention. The embodiment illustrates one way in which the present invention can be implemented—in this case, a process and apparatus that can be used to configure a customizable product such as a motor vehicle. In the description that follows, like numerals represent like elements in all figures. For example, where the numeral 10 is used to refer to a particular element in one figure, the numeral 10 appearing in any other figure refers to the same element.

The embodiment of the inventive apparatus and process provides a computationally efficient means by which a user can configure an orderable vehicle over a network such as the Internet. More specifically, the embodiment provides an apparatus and process for configuring a vehicle using the portion of the Internet known as the World Wide Web (the "Web"). A vehicle is defined by a base configuration having a set of standard attributes (i.e., standard equipment), and a set of optional attributes (i.e., optional equipment) selected by the user from an option data set (i.e., among all available options available for that base configuration). Thus, for example, a user may want to get a 2000 Toyota 4Runner SR5 4WD with leather seats, CD player and alloy wheels. In this case, the base configuration is defined by the year, make, model and style of the vehicle—a 2000 (year) Toyota (make) 4Runner (model) SR5 4WD(style). This base configuration will have a set of standard attributes, such as a certain size engine, a certain transmission, etc. To configure the vehicle, the user selects the set of optional attributes they want—in this case, leather seats, CD player and alloy wheels—and either adds them to the set of standard attributes or substitutes them for some of the standard attributes to arrive at an orderable vehicle. A vehicle is orderable if all selected options are compatible with each other (i.e., no conflicting options) and no required options remain unselected.

Using the apparatus and process, a user connects to a server from their client computer. The apparatus and process achieve their efficiency by transferring all of the computation involved in configuring a vehicle from the server to the client; in other words, it exploits client-side processing by transferring to the client computer all the computation involved in selecting a set of optional attributes. As further explained below, the process and apparatus transfer all the computation to the client by transferring a set of commands to the client machine. The transferred commands, in this embodiment a series of pre-generated Web pages, provide the data and logic the user needs to configure their own orderable vehicle. The commands embedded in the Web pages are preferably written in JavaScript version 1.0 and are executed by a program such as a Web browser. The series of Web pages, known as option pages, may be pre-generated for each base configuration, so that when a user wants to configure a vehicle it is simply a matter of downloading the pages. Little or no computation is required from the server. Because all the option selection is done using the option pages running on the client, the process is very computationally efficient since it does not require multiple communications with the server and does not depend on the server to run the option selection process. Thus, the server load is dramatically reduced and the server can simultaneously service many more users.

The entire process of configuring a vehicle as described herein can optionally be coupled with a process and apparatus for purchasing a vehicle on-line from a dealer, vehicle broker, or manufacturer once the base configuration and set of optional attributes are selected.

FIG. 1 illustrates the overall process a user goes through to configure an orderable vehicle. To begin the process, the user establishes a network connection at step 20 between the client 60 and the server 40 (see FIGS. 2 and 3). Using a Web browser on the client 60, the user selects a desired base configuration at step 22 by selecting a year, make, model and style of vehicle. When a base configuration is selected, its set of standard attributes (i.e. the standard equipment) and other information is downloaded from the server 40 to the client 60 at step 24. The user studies the standard attributes and other information and decides at step 26 whether they are interested in this vehicle and wish to configure it by selecting a set of optional attributes (i.e., optional equipment). If at step 26 the user does not want to configure the selected vehicle, the user decides at step 27 whether to select another base configuration by returning to step 22 or end the session at step 28.

If the user wants to proceed with configuring a vehicle at step 26, they pick the options selection from the standards page and the option pages are downloaded to the client at step 30. As further explained below, the option pages contain all the necessary logic and data that allow the user to select compatible options and configure an orderable vehicle. The user configures their vehicle at step 32 by selecting their set of optional attributes (optional equipment). When the user finishes configuring the vehicle at step 32, they must decide at step 34 whether they want to purchase the vehicle. If the configuration process is coupled with an on-line car buying system, the user can proceed to step 36, where the base configuration, the set of standard attributes, and the set of optional attributes is transmitted to the ordering system. The ordering system then transmits the vehicle information, along with any information gathered from the user, to dealers, vehicle brokers, or manufacturers so that they may obtain a price quote. If the configuration process is not coupled with an on-line ordering system, then the user proceeds from step 34 to step 27, where the user decides whether to configure another vehicle. If at step 27 the user wants to examine another vehicle, they proceed to step 22 and select another base configuration. If the user at step 27 does not want to examine another vehicle, the proceed to step 28, where they can either go elsewhere within the site hosting the process, end their session, or go to a different Web site on the network. The details of some of the steps shown in FIG. 1 are illustrated in subsequent figures.

Figure 2:
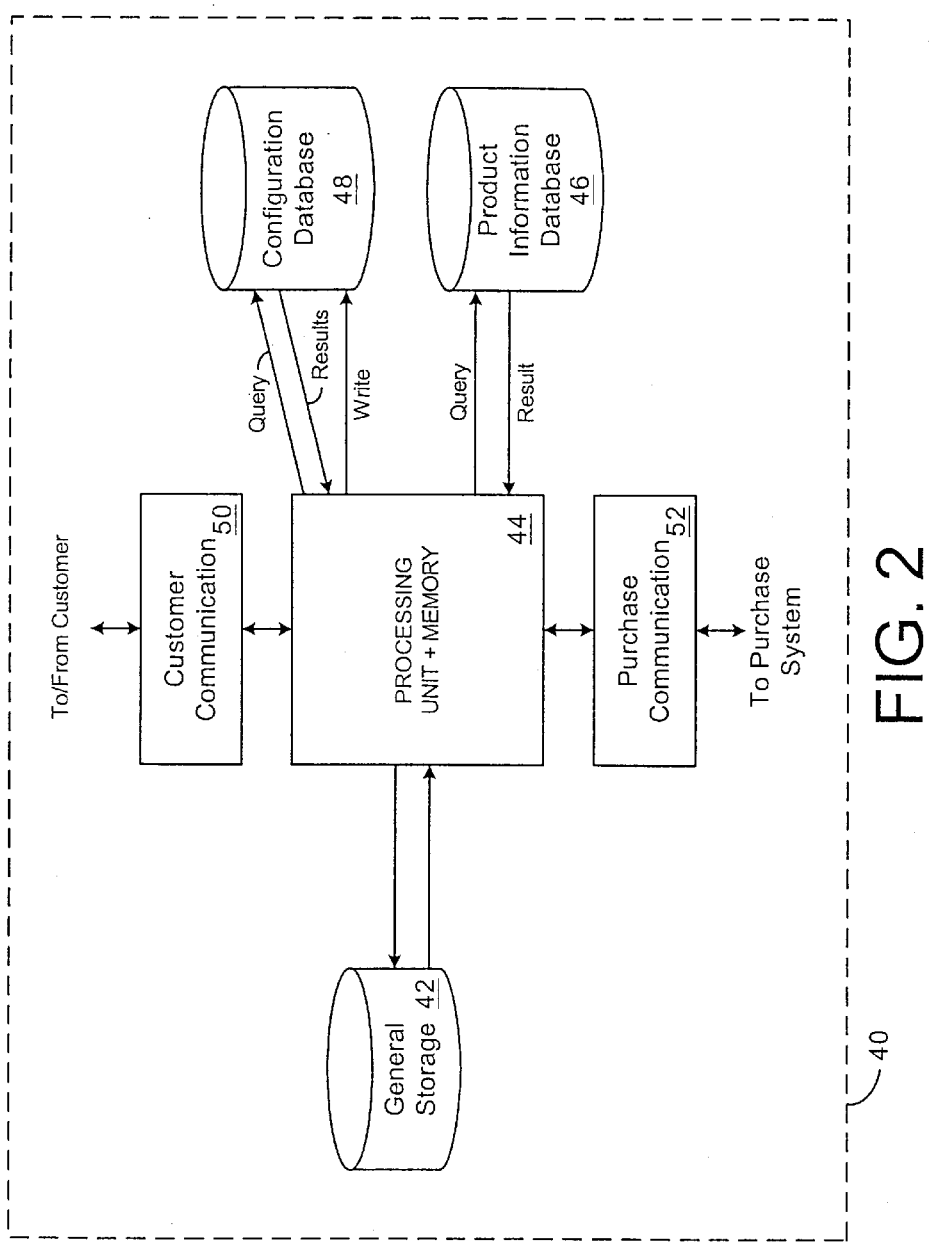
FIG. 2 is a block diagram of a server computer which is part of the apparatus of the present embodiment of the invention.

FIG. 2 illustrates details of the server 40. The server 40 is essentially a high-capacity, high-speed computer that includes a storage device 42 and a processing unit 44 with access to two databases: a product database 46 and a configuration database 48. Also connected to the processing unit 44 is sufficient memory (shown as part of the processing unit, but the memory could be a separate component) and appropriate client communication hardware 50. Communication hardware 52 to allow communication with a vehicle ordering system may also be added if the server is linked to such a system. The communication hardware 50 or 52 may be modems, ethernet connections, or any other suitable communication hardware. Although the server 40 is shown as a single computer having a single processing unit 44, the server functionality could also be spread over several networked computers, each having its own processors and storage devices and having one or more databases residing thereon.

In addition to the elements described above, the storage device 42 of the server 40 has an operating system and communication software stored thereon to allow the server to communicate with other computers. The preferred operating system is Microsoft Windows NT, while the preferred communication software is a Microsoft IIS (Internet Information Server) server with associated programs. The databases on the server 40 contain the information necessary to make the apparatus and process work. The product database 46 stores the raw information about every base configuration, while the configuration database 48 stores the standards and option pages generated for each base configuration. The databases are assembled and accessed using any commercially available database software, such as Microsoft Access, Oracle, etc. Microsoft SQL Version 7.0 is the preferred database for this application.

Figure 3:
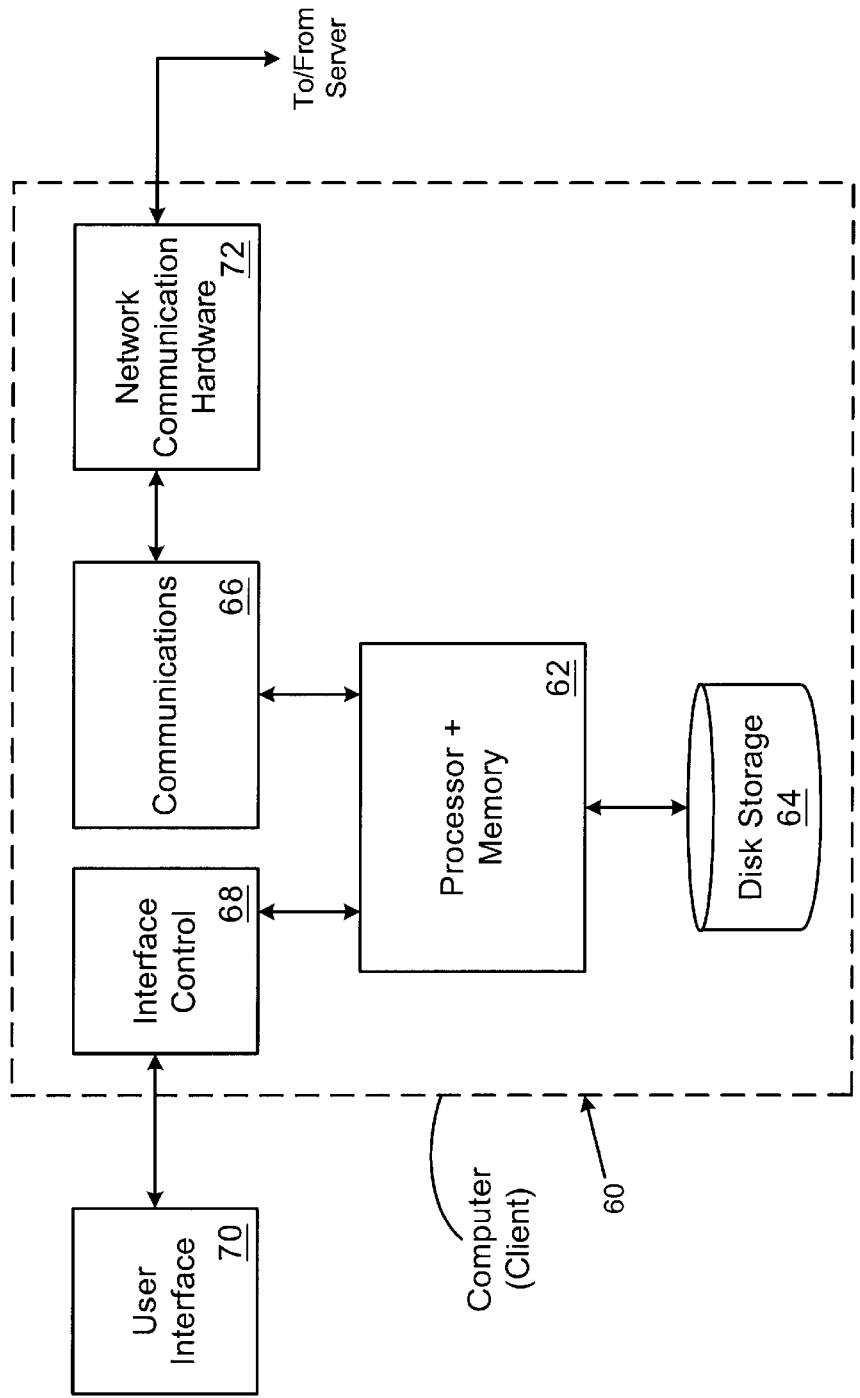
FIG. 3 is a block diagram of a client computer which is part of the apparatus of the present embodiment of the invention.

FIG. 3 illustrate hardware details of the client 60. The client 60 generally includes a processor 62 attached to storage unit 64, a communication controller 66, and an interface controller 68. The interface Controller runs a user interface 70 through which the user interacts with the client 60. The user interface comprises, among other things, a monitor, keypad, and mouse. In essence, the client 60 is a computer which runs software providing a means for communicating with the server 40. This software is preferably an Internet web browser, such as Microsoft Internet Explorer, Netscape Navigator, or other suitable Internet web browsers. The client 60 also includes a suitable operating system, such as Microsoft Windows 95, Windows 98, Windows 2000, or Windows NT.

Figure 4:
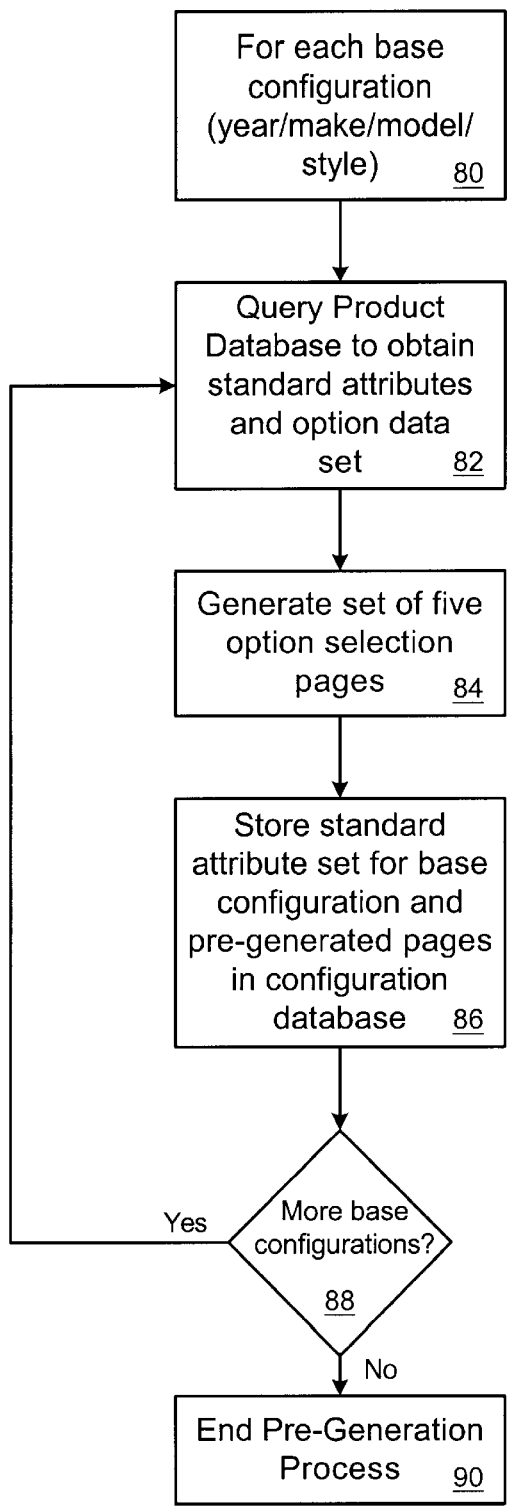
FIG. 4 is a flowchart showing the process by which the Web pages (option pages) shown in FIG. 5 are pre-generated.

FIG. 4 illustrates the pre-generation of the option pages necessary to implement the inventive apparatus and process. Although pre-generated in this embodiment, the pages need not always be pre-generated. The option pages may be created whenever a request for a base configuration is received, or some of the option pages may be pre-generated while others are generated when needed. Beginning with step 80 and 82, each base configuration is examined. For each base configuration, the product database 46 is queried to extract a set of standard attributes (i.e., the standard equipment) and an option data set containing all optional attributes available for that particular configuration. Using the option data set, a plurality of Web pages known as option pages are generated for each base configuration at step 84. These option pages contain all the option data for the base configuration and also contain logic that allows them to interact amongst themselves so a user can select the set of optional attributes they want with their vehicle. The option pages are further described below in connection with FIG. 5. At step 86, the set of standard attributes and the option pages are stored in the configuration database 48. At step 88, the process checks to see if there are more base configurations to be processed. If there are more base configurations, the process returns to step 82 where the database is queried for a new base configuration and a new set of option pages is generated for the new base configuration. If there are no further base configurations, the pre-generation ends at step 90. Typically, the pre-generation will be done periodically to update the configuration database whenever the product database is updated. For vehicles, the pre-generation is preferably carried out once a week.

Figure 5:
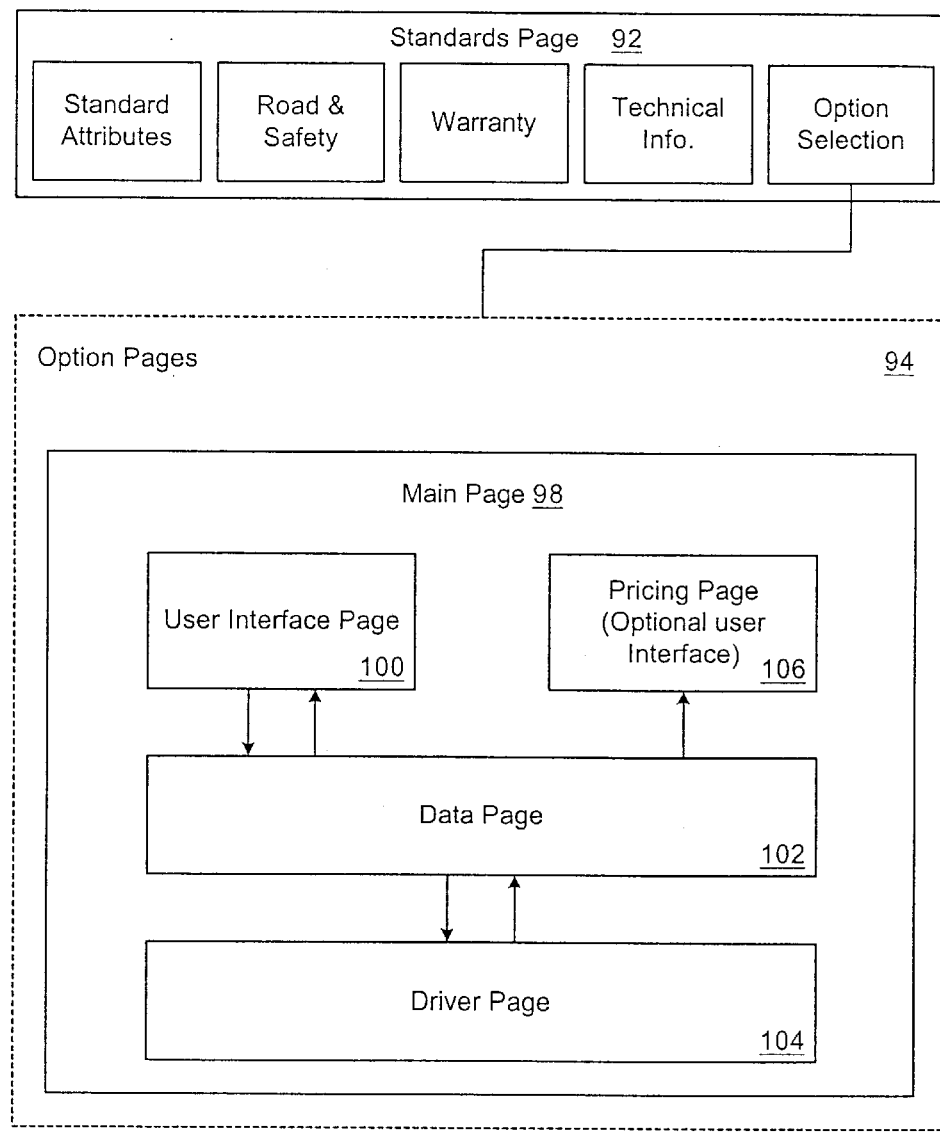
FIG. 5 is a diagram of the structure of and interaction between the option pages.

FIG. 5 illustrates how the information is currently kept in the configuration database for each base configuration. For each base configuration, there is a standards page 92 and a plurality of option pages 94. The standards page, as its name implies, contains the set of standard attributes (i.e., the standard equipment) and links to other information for the selected base configuration. The standard attributes are grouped together under a tab on the standards page. The other information is grouped into categories under several tabs on the page, including road and safety information, warranty information, and technical information. If the user wants to link to information in any of these categories, they simply select the tab leading to that category and the information is downloaded to the client 60.

An option selection tab 96 on the standards page leads to the option pages 94. The option pages 94 comprise a plurality of Web pages, including a main or parent page 98, a user interface page 100, a data page 102, a driver page 104, and an optional summary pricing page 106 which displays to the user a running total cost of the vehicle as the user selects options. The option pages interact with each other to allow a user to select compatible options which define an orderable vehicle. The main or parent page 98 links all the other pages. As its name implies, the user interface page 100 displays the options for the user, accepts user input, and allows the user to interact with the other pages. Although its name implies otherwise, the data page 102 does not actually contain the option data set. The data page instead translates and passes data between the, user interface and the driver page. Translation is needed because the user interface must represent the data in a way that can be read by the user, while the driver page 104 needs the option data represented in a computationally efficient form. Although its functionality is important and its presence helps add flexibility to the process, the data page 102 need not be a separate page. Its functionality could be built into one of the other pages like the driver page 104.

The driver page 104 is the most important page because it controls the option selection. In addition to containing the complete option data set from which the user selects a set of optional attributes, the driver page contains logic to ensure that all the attributes selected by the user are compatible with each other. The driver page need not contain both the data and the logic: these could be split into separate modules so that the logic need only be downloaded once in the event several base configurations are examined. The logic operates on the data to perform several functions. First, it checks whether there is a conflict between options; for example, if the user selects a transmission incompatible with the selected engine, the logic will notify the user. Similarly, if the user picks an option which requires the presence of other options, the logic will automatically add the necessary option and notify the user. Finally, if the user picks an option which requires the presence of another option for which there are several choices, the logic will pick this up, notify the user that a selection must be made, and prompt the user for such a selection. The logic in the driver page is further described below in connection with FIG. 8. The driver page, along with the other option pages, is programmed in a browser-supported scripting language, preferably JavaScript.

A final page in the option pages is the summary pricing page 106 which provides the user with a running total price as the user adds options to the vehicle. The summary pricing page is essentially just another user interface which transmits the summary pricing information from the data page 102 to the user.

Figure 6:
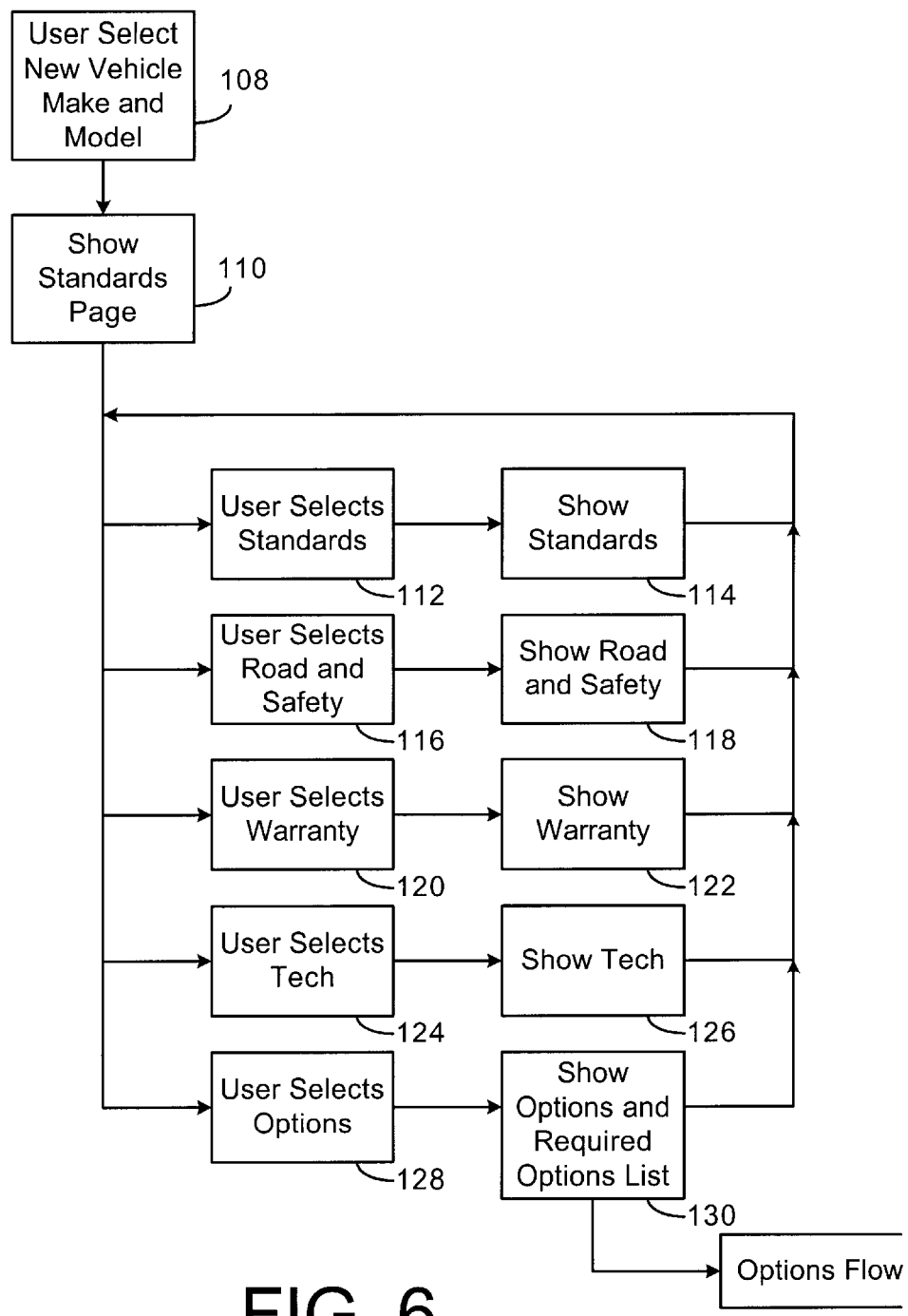
FIG. 6 is a flowchart showing the overall process used in the present embodiment of the invention.

FIG. 6 illustrates the initial steps in the operation of the process and apparatus. The process begins at step 108, where the user selects their base configuration by selecting a year, make, model and style. When the user has selected the base configuration, the standards page 92 is downloaded to the client at step 110 and the user sees several tabs which link to different categories of information. At step 112, the user selects the standards category, and the standards are displayed at step 114. At step 116, the "road test and safety" category is selected, and the road test and safety characteristics of the base configuration are downloaded and displayed at step 118. At step 120, the user selects the "warranty" category, and the warranty information downloaded and displayed at step 122. Finally, at step 124, the user selects the "tech" section and the technical specifications of the base configuration are downloaded and displayed at step 126. If the user likes what he or she saw at any point between steps 110 and 126, he or she proceeds to step 128 to select a set of optional attributes for their vehicle (step 130), that is, to add options to the base configuration. The set of optional attributes is selected from the option data set that contains all the available optional attributes that can be added to the selected base configuration. The process of selecting optional attributes is further described below in connection with FIG. 7.

Figure 7:
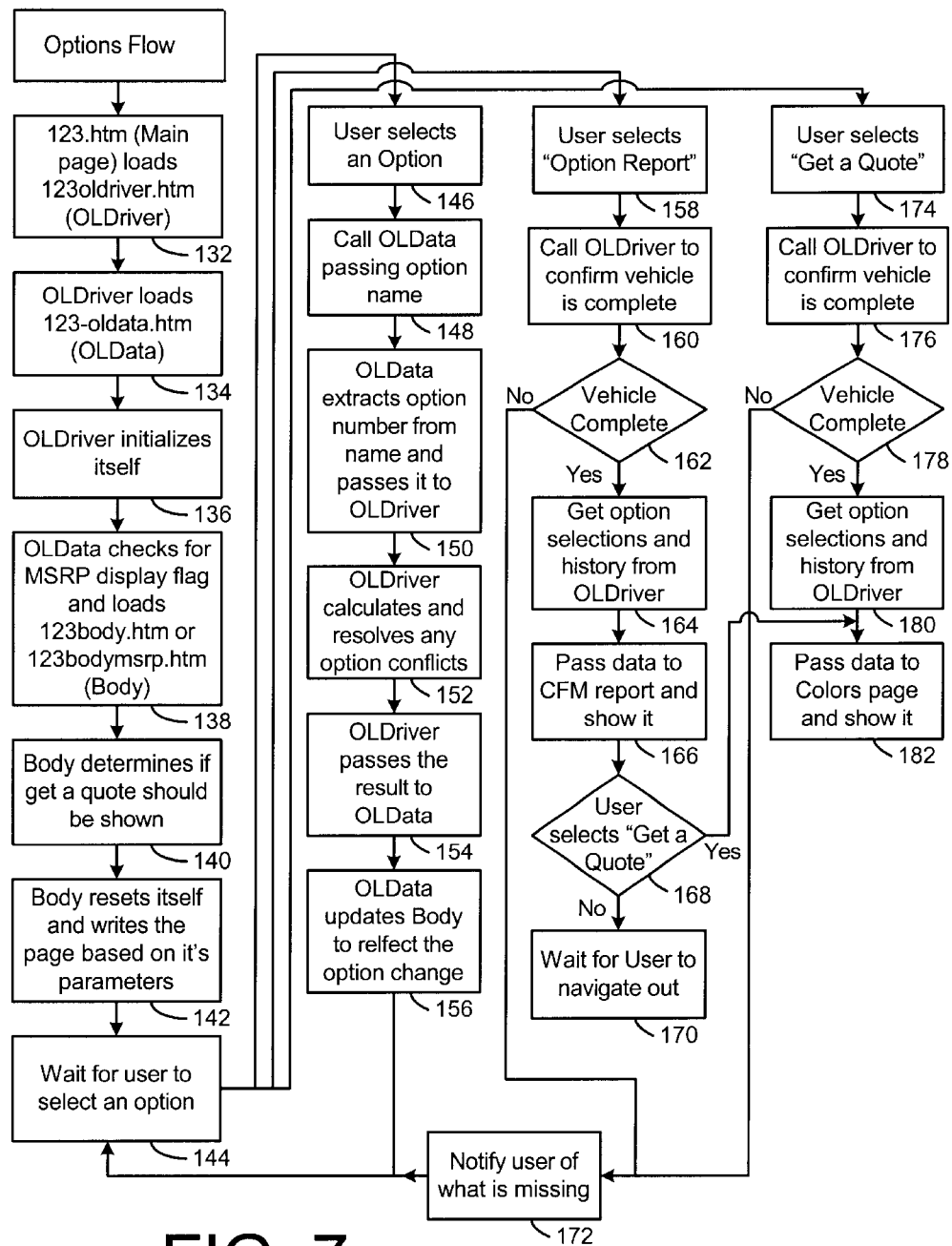
FIG. 7 is a flowchart showing the option selection process which is part of the overall process shown in FIG. 6.

FIG. 7 illustrates the operation of the option selection process embodied in the option pages 94. When the user elects to view the option pages at step 130, the process proceeds to step 132. At step 132, the server 40 automatically downloads the main or parent page 98 (referred to in the figure as the main page) onto the client 60. The main page then "pulls" some of the remaining pages from the server onto the client, starting with the driver page 104 at step 132 and the data page 102 at step 134. When the driver and data pages have been loaded, the data page checks at step 138 to see whether the pricing display flag is set. The pricing display flag is set by the server and downloaded to the client and determines what level of pricing (MSRP and dealer invoice or MSRP only) will be viewable by the user through the summary pricing page 106. Based on the flag's setting, the data page decides which version of the summary pricing page to download to the client: if the flag is set, the summary pricing page 106 including only MSRP information is transferred; otherwise, the summary pricing page 106 including both MSRP and dealer invoice is downloaded.

At step 140, the user interface page 100 decides whether it should display a "get a quote" option. As mentioned above, the present embodiment of the apparatus and process can be linked to an ordering or bidding system to allow the user to configure a vehicle and, once the vehicle is configured, request bids from dealers, vehicle brokers, and manufacturers. Usually, the operator of the server 40 decides whether they want to be linked to such an ordering system. If the apparatus and process are linked to such a system, the "get a quote" option allows the user can submit their configuration for bid or purchase. The main page 98, user interface page 100, data page 102, driver page 104, and summary pricing page 106 initialize at step 136 and 142 and wait for user input at step 144. Depending on the user's selection at step 144, the process goes to step 146 to select options, step 158 to get a report showing all options currently selected or, if the apparatus and process are so configured, to step 174 to get a price quote on the configured vehicle.

If the user wants configure a vehicle by choosing a set of optional attributes, he or she selects an optional at step 146. After the user selects an option via the user interface page 100, the process calls the data page 102 at step 148, and passes the selected option to the data page. The data page then transfers the data for the selected option from the user interface page 100 to the driver page 104 at step 150, re-formatting the data so that the driver page will understand it. At step 152, the driver page calculates any additional requirements for the selected option and resolves any conflicts among all the options selected so far. The process of step 152 is further discussed below in connection with FIG. 8. When all requirements and conflicts are resolved at step 152, the process goes to step 154, where the driver page passes the selected option data to the data page, which re-formats the data so that it can be understood by the user interface page. At step 156, the data is passed from the data page to the user interface page and the user interface is updated to show the selection made by the user and any additional selections which must be made by the user, as determined by the driver page. The process then returns to step 144, where it waits for further user input. If the user wants to select further options to add to their set of optional attributes, they select another option at step 146.

If at step 144 the user wants to view the current configuration they have put together, the user can select a report at step 158. When a report is selected, the process goes to step 160, where the driver page is called to check the existing configuration to see whether it defines a complete, orderable vehicle. A vehicle is orderable if no required options remain unselected. This check at step 162 is performed according to the process shown in FIG. 8, which is further described below. If the vehicle is not complete, a step 172 notifies the user what is missing and returns to step 144 to await further user input. If the vehicle is complete, then at step 164 the current set of selected optional attributes is retrieved from the driver page 104 and passed to the user interface page at step 166 so that only the selected items are presented to the user. If the configuration process and apparatus are linked to an on-line ordering system, the user proceeds to step 168, where they decide if they would like to place and order. If they do, then the data is passed to step 182 where the user selects the color(s) they want or will accept for the vehicle. Thereafter, the set of standard attributes and the set of optional attributes selected by the user are passed on to the ordering system for processing.

If the embodiment of the present apparatus and process is linked to an on-line ordering or bidding system, the user can access the system at step 144 by selecting that option and proceeding to step 174. Having selected step 174, the process executes steps 176 and 178, which checks to ensure the vehicle is complete and orderable before it is submitted to the ordering or bidding system. Steps 176, 178 and 180 are identical to steps 160, 162- and 164, which are performed when the user requests a vehicle report. The set of standard attributes and set of optional attributes are then passed on to step 182 and thereafter to the ordering system for processing.

Figure 8:
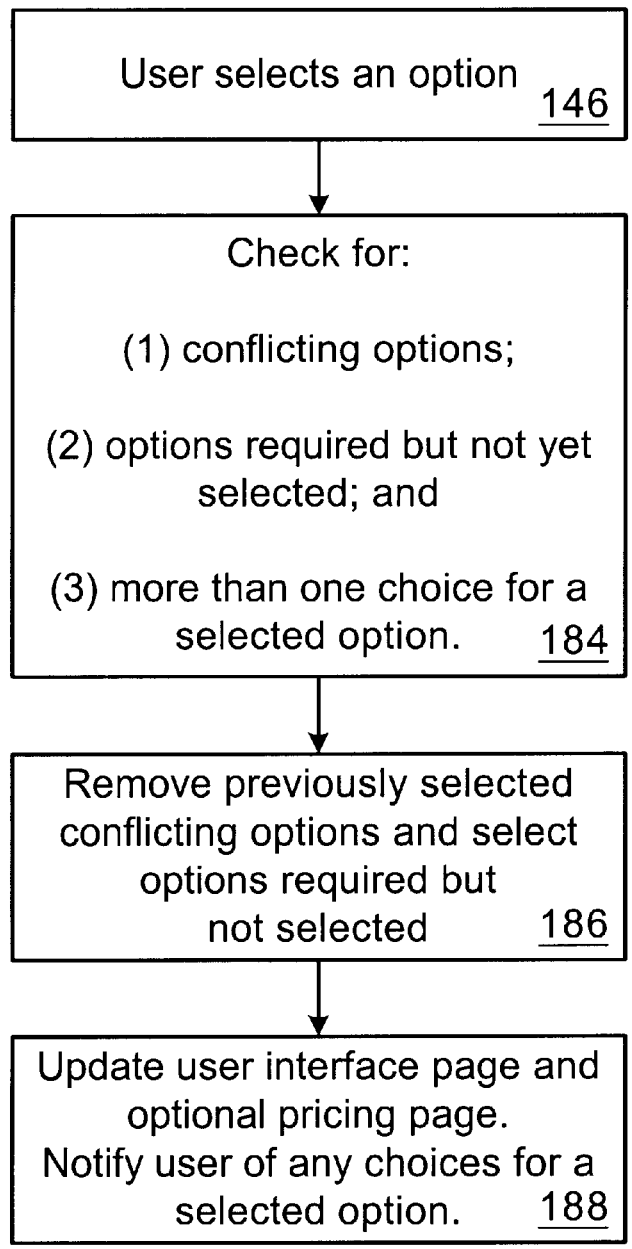
FIG. 8 is a flowchart showing the option checking process, which is part of the option selection process shown in FIG. 7.

FIG. 8 illustrates the process used by the driver page 104 to ensure that the user selects compatible options that result in an orderable vehicle. When the user selects an option at step 146, the process checks three things at step 184. First, the process checks whether that option conflicts with any previously selected option. If there is a conflict, the logic assumes that the most recently chosen option is the correct one, and removes the previously selected option with which it conflicts at step 186. Second, the process checks at step 184 whether the selected option requires any other options. If the selected option requires another option—for example, if the user selects an engine that requires a particular transmission—the required option is automatically added at step 186. Finally, step 184 determines whether there is a choice among the options to be selected. If there is a choice, the process makes a default choice, updates the user interface page and notifies the user of the default choice and the other available choices at step 188 and waits for the user to select from among the choices.

An embodiment of the present invention has been described above. A person skilled in the art will, however, recognize that many other embodiments are possible within the scope of the invention. In particular, other embodiments are possible that incorporate more or different features and that apply to products other than vehicles. For this reason, the scope of the invention is not to be determined from the description of the embodiment, but must instead be determined solely from the following claims.

What is claimed is:

1. A process for configuring a product using a server and a client connected by a network, wherein the product has multiple possible configurations defined by a set of standard attributes and a set of optional attributes, the process comprising:

receiving from the client a request for a base configuration comprising the set of standard attributes;

transmitting to the client the set of standard attributes for the base configuration in response to the request; and transmitting to the client, also in response to the request, a plurality of Web pages containing an option data set including only all possible optional attributes corresponding to the base configuration and a set of commands that, when executed on the client allow a user to select elements from the set of optional attributes to configure the product using the client without further interaction with the server to configure the optional attributes.

2. The process of claim 1 further comprising transmitting a complete product definition including the set of standard attributes and any selected elements from the set of optional attributes from the client to the server.

3. The process of claim 1 wherein the plurality of Web pages comprises:

a main page which links the plurality of pages;

a user interface page comprising an option selection page; and a driver page which contains the option data set and the set of commands which controls a user's selection of a combination of options.

4. The process of claim 3 wherein the plurality of Web pages further comprises a data page which manages the interaction between the user interface page and the driver page.

5. The process of claim 3 wherein the plurality of Web pages further comprises a pricing page for displaying pricing information on the client.

6. The process of claim 3 wherein transmitting the plurality of Web pages comprises:

transmitting the main page from the server to the client; and pulling the user interface page and driver page from the server using the main page.

7. The process of claim 1 wherein executing the set of commands comprises executing the commands using a Web browser.

8. The process of claim 1 wherein the set of commands contained in the plurality of Web pages define a process comprising:

checking a selected optional attribute to see if it conflicts with a previously selected optional attribute;

checking a selected optional attribute to see if it requires selection of one or more other optional attributes; and checking a selected optional attribute to determine if there is more than one choice for that type of optional attribute.

9. The process of claim 8 wherein the process defined by the set of commands further comprises:

removing the previously selected optional attribute from the set of optional attributes if the previously selected optional attribute conflicts with the selected optional attribute;

selecting the second optional attribute if it is required by the first optional attribute; and notifying the user if there is more than one choice for that type of selected attribute.

10. A process for configuring a product using a client connected to a server by a network the product having multiple possible configurations, and wherein each configuration is defined by a set of standard attributes and a set of optional attributes, the process comprising:

transmitting a request for a base configuration from the client to the server;

transmitting a set of standard attributes defining the requested base configuration from the server to the client in response to the request;

transmitting, also in response to the request, a plurality of Web pages containing an option data set including only all available optional attribute associated with the requested base configuration and a set of commands for selecting a set of optional attributes from the server to the client; and executing the set of commands on the client to select a compatible set of optional attributes from among all optional attributes found in the option data set without further interaction with the server.

11. The process of claim 10 further comprising transmitting a complete product definition including the set of standard attributes and the set of optional attributes from the client to the server.

12. The process of claim 10 wherein the plurality of Web pages comprises:

a main page which links the plurality of pages;

a user interface page comprising an option selection page; and a driver page which contains the option data set and the set of commands which controls a user's selection of a combination of options.

13. The process of claim 12 wherein the plurality of Web pages further comprises a data page which manages the interaction between the user interface page and the driver page.

14. The process of claim 12 wherein the plurality of Web pages further comprises a pricing page for displaying pricing information on the client.

15. The process of claim 10 wherein transmitting the option data set and the set of commands comprises:

transmitting the main page from the server to the client; and pulling the user interface page and driver page from the server using the main page.

16. The process of claim 10 wherein executing the set of commands comprises executing the commands using a Web browser.

17. The process of claim 10 wherein the set of commands contained in the plurality of Web pages define a process comprising:

checking a selected optional attribute to see if it conflicts with a previously selected optional attribute;

checking a selected optional attribute to see if it requires selection of one or more other optional attributes; and checking a selected optional attribute to determine if there is more than one choice for that type of optional attribute.

18. The process of claim 17 wherein the process defined by the set of commands further comprises:

removing the previously selected optional attribute from the set of optional attributes if the previously selected optional attribute conflicts with the selected optional attribute;

selecting the second optional attribute if it is required by the first optional attribute; and notifying the user if there is more than one choice for the selected attribute.

19. An apparatus comprising:

a storage device comprising content; and a processing element, coupled with the storage device, to execute at least a subset of the content to implement a product configurator, to receive from a remote client a request for a base configuration of a product defined by a set of standard attributes, to transmit to the client the standard attribute set for the requested base configuration in response to the request, and, also in response to the request, to transmit to the client a plurality of web pages containing an option data set including only all possible optional attributes associated with the requested base configuration along with a set of commands which, when executed at the client, enable a user to select elements from the set of optional attributes to configure a desired product definition without further interaction with a server.

20. An apparatus according to claim 19, wherein the set of commands includes a command to enable the user to transmit the configured product definition from the client to the apparatus over a network coupling the apparatus to the client.

21. An apparatus according to claim 20, wherein the product configurator receives the configured product definition from the client to facilitate the purchase of the configured product.

22. An apparatus according to claim 19, wherein the set of commands ensures that the user does not select elements of the option data set that are mutually exclusive of one another.

* * * * *